United States Patent [19]

Katsushima

[11] Patent Number: 5,436,307
[45] Date of Patent: Jul. 25, 1995

[54] AQUEOUS COATING COMPOSITION AND ITS PREPARATION

[75] Inventor: Akifumi Katsushima, Yokohama, Japan

[73] Assignee: National Starch and Chemical Investment Holding Corporation, Wilmington, Del.

[21] Appl. No.: 80,270

[22] Filed: Jun. 21, 1993

[30] Foreign Application Priority Data

Jun. 30, 1992 [JP] Japan .................. 4-172899

[51] Int. Cl.$^6$ .............................. C08L 43/04
[52] U.S. Cl. .................. 526/279; 524/543; 526/286; 526/303.1; 526/317.1; 526/319; 526/347
[58] Field of Search .............. 526/279; 524/543

[56] References Cited

U.S. PATENT DOCUMENTS

| | | | |
|---|---|---|---|
| 3,706,709 | 12/1972 | Erikson et al. | |
| 3,966,687 | 6/1976 | Ribba | 526/317 |
| 4,826,904 | 5/1989 | Matsumura | 524/314 |
| 4,975,488 | 12/1990 | Furukawa | 525/100 |
| 5,032,641 | 7/1991 | Nanishi | 524/544 |
| 5,258,443 | 11/1993 | Nield | 524/501 |
| 5,284,900 | 2/1994 | Izubayashi | 524/492 |

FOREIGN PATENT DOCUMENTS 998221 2/1963 United Kingdom.

*Primary Examiner*—Fred Zitomer
*Attorney, Agent, or Firm*—William K. Wissing

[57] ABSTRACT

An aqueous coating composition with excellent adhesion and waterproof properties is prepared by copolymerizing an alkoxysilane compound, a hydrophilic monomer, and a hydrophobic ethylenically unsaturated monomer at a specific ratio in an organic solvent, and then substituting the organic solvent with aqueous medium. The copolymerization reaction is stable, and the aqueous composition, which is a solution or dispersion, does not contain any substances to deteriorate the water resistance of the resulting film.

3 Claims, No Drawings

AQUEOUS COATING COMPOSITION AND ITS PREPARATION

The present invention relates to an aqueous coating composition containing an alkoxysilane compound that may be employed as a primer, top coat, or the like. The coating compound has excellent adhesion to various substrates and is capable of forming a film with extremely high waterproof properties.

BACKGROUND OF THE INVENTION

Alkoxysilane compounds are widely known and available and are used in either solvent based or aqueous based coating compositions. In solvent based compositions the silane compound or a polymer containing silane is dissolved in a hydrophobic organic solvent or alcohol. Although this composition is very efficient, it suffers drawbacks, such as toxicity or a harmful influence on environment. These drawbacks are substantially reduced with the use of aqueous based coatings, but these aqueous based coatings can exhibit reduced waterproof properties. The aqueous based compositions are mainly ordinary emulsion polymers containing alkoxysilane that are prepared in the presence of a surfactant and a polymerization initiator, or they are hydrophobic resins containing silane that are compulsorily emulsified in the presence of water-soluble high molecular weight molecules. These surfactants, water-soluble polymerization initiators, and water-soluble high molecular weight molecules utilized in the polymerization process can persist in the films formed from the emulsion polymers and cause a reduction in waterproofing properties. Furthermore, the alkoxysilane compound itself is subject to hydrolysis and condensation, which during the polymerization process can cause gelation and a deterioration in the stability of the polymerization through anastomosis of the emulsion particle. For these reasons alkoxysilane compounds have not previously been put into practical use in aqueous based coating materials.

Accordingly, an object of the invention is to provide aqueous coating compositions that can form a paint film with excellent waterproof properties and adhesion to various substrates.

SUMMARY OF THE INVENTION

This invention is directed to a copolymer for use as an aqueous coating composition that comprises the polymerized reaction product of (A) 0.5–50% by weight of the copolymer of an alkoxysilane compound capable of hydrolysis in water and radical polymerization, (B) 1–50% by weight of the copolymer of a hydrophilic monomer having an unsaturated double bond, and (C) not more than 98.5% by weight of the copolymer of a hydrophobic ethylenically unsaturated monomer.

In a second embodiment, this invention is directed to a method for the preparation of the copolymer comprising (A) copolymerizing in an organic solvent the following monomers at the stated ratios: (i) 0.5–50% by weight of the copolymer of an alkoxysilane compound capable of hydrolysis in water and radical polymerization, (ii) 1–50% by weight of the copolymer of a hydrophilic monomer having an unsaturated double bond, and (iii) not more than 98.5% by weight of the copolymer of a hydrophobic ethylenically unsaturated monomer, (B) adding water to the polymerized medium, and then (C) removing the organic solvent to form a fully aqueous solution or dispersion.

The resulting aqueous coating composition does not contain any surfactant, water-soluble high molecular weight molecule, or the like, which are the causes of the disadvantages of aqueous based compositions. Further, when the polymerized residues of the monomers (A), (B) and (C) in the copolymer are present in the specific stated ratio, the film formed from the coating composition has excellent waterproof properties.

Suitable alkoxysilane compounds (monomer A) are represented by the structural formula:

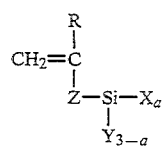

in which R is hydrogen or an alkyl group containing not more than 3 carbon atoms;

Z is $-(CH_2)_n$ or

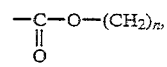

where n represents an integer of 0 to 3;

X is $-OCH_3, -OC_2H_5,$ or $-O-(CH_2)_m-O-(CH_2)_p-H$, where m and p each represents an integer 1 to 3; Y is $-O(CH_2)_q-H$, where q represents an integer 0 to 3; and a represents an integer 1 or 2.

Specific examples are vinyl trimethoxysilane, vinyl ethoxysilane, vinyl tris (β-methoxy ethoxy)silane, 3-methacryloxypropyl trimethoxysilane, 3-methacryloxypropyl methyldimethoxysilane, 3-methacryloxypropyl dimethylmethoxysilane, and the like. The quantity of the specific alkoxysilane compound (monomer A) for copolymerization will be 0.5–50% by weight of the total quantity of the monomers (A) to (C), or otherwise stated, by weight of the copolymer. In general, the aqueous coating composition cannot demonstrate adequate adhesion to the substrate when the alkoxysilane is present in an amount less than 0.5% by weight, and its shelf stability deteriorates when the alkoxysilane is present in an amount over 50% by weight.

Suitable hydrophilic monomers having an unsaturated double bond (monomer B) will contain a carboxyl group, a hydroxyl group, an amide group, an amino group, a sulfone group, a sulfonium group, or polyethylene oxide, and are employed alone or in combination. These monomers contribute the hydrophilic property to the obtained copolymer.

Exemplary monomers containing a carboxyl group are acrylic acid, methacrylic acid, maleic acid, fumaric acid, itaconic acid, crotonic acid, and the like. Exemplary monomers containing a hydroxyl group are 2-hydroxyethyl acrylate, 2-hydroxyethyl methacrylate, 2-hydroxypropyl acrylate, 2-hydroxypropyl methacrylate, and the like. Exemplary monomers containing an amide group are acrylamide, methacrylamide, methylene bisacrylamide, methylene bismethacrylamide, n-methylol acrylamide, n-methylol methacrylamide, and the like. Exemplary monomers containing an amino group include dimethylaminoethyl acrylate, dimethylaminoethyl methacrylate, diethylaminoethyl acrylate, diethylaminoethyl methacrylate, dimethylaminopropylacrylamide, dimethylaminopropylmethacrylamide, and the like.

Exemplary monomers containing a sulfonic group include acryl sulfonic acid, methacryl sulfonic acid, 2-sulfoethyl acrylate, 2-sulfoethyl methacrylate, 2-acrylamide-2-methylpropane sulfonic acid, 2-methacrylamide-2-methylpropane sulfonic acid, and the like. Exemplary monomers containing polyethylene oxide are acrylate adducted with around 2 to 50 units of ethylene oxide, methacrylate adducted with around 2 to 50 units of ethylene oxide, and the like. The quantity of the specific hydrophilic monomer having an unsaturated double bond (monomer B) for copolymerization will be 1.0–50% by weight of the total of the monomers (A) to (C), or otherwise stated, by weight of the copolymer. In general, the presence of the hydrophilic monomer in an amount less than 1% by weight can result in precipitation of the dispersed polymer, and its presence in an amount greater than 50% by weight can cause a deterioration in the waterproof properties of the formed film.

When a monomer containing a carboxyl group and a sulfonic group is employed as the hydrophilic monomer (B), it is preferable to compound the monomer in an aqueous solution containing a water-soluble monovalent organic or inorganic alkaline substance in order to fully dissociate the carboxyl group and sulfonic group. This improves the stability of the resulting dispersed polymer. In this case, the quantity of the compounded monomer to be added to the polymerization medium is calculated to be an amount to cause the resulting polymer to be soluble in water or to be dispersed in a stable emulsion, and this calculation is within the expertise of one skilled in the art.

Suitable hydrophobic ethylenically unsaturated monomers (monomer C), include acrylic, methacrylic, styrene group monomers and similar monomers that are known and used in ordinary copolymerizations to give hydrophobic properties.

To prepare the copolymer, the monomers are polymerized in the presence of a polymerization initiator, chain transfer agent, and the like, in an organic solvent. The organic solvent is later substituted with water and the coating composition is obtained as a fully aqeuous solution or dispersion.

As polymerization initiators, organic peroxides or azonitriles may be used. For example, suitable peroxides are t-butyl peroxyisobutyrate, t-butyl peroxy(2ethyl hexanoate), t-butyl peroxypivalate, t-butyl peroxyneodecanoate, cumyl peroxyoctanoate, cumyl peroxy neohexanoate, cumyl peroxyneodecanoate, t-hexyl peroxyneohexanoate, t-hexyl peroxyneodecanoate, and the like. Suitable azonitrile compounds are 2,2'-azo-bis(2-methyl azonitrile), 2,2'-azo-bis isobutyronitrile, 2,2'-azo-bis(2-cyclopropyl-propionitrile), and the like. These are used alone or in combination.

The chain transfer agent is used to adjust the molecular weight and the hydrophilic property of the polymer, and the viscosity of the aqueous coating composition. Examples of suitable chain transfer agents are alkyl mercaptans with water-soluble property or hydrophobic property, and the like.

The use of the organic solvent avoids hydrolysis and condensation of the alkoxysilane during the polymerization process, which can result in gelation or deterioration of polymerization stability. The organic solvent may be any that is easily miscible in water. Examples are acetone, methanol, ethanol, isopropanol, n-propanol, dioxane, ethylene glycol, propylene glycol, glycerin, methyl carbitol, ethyl carbitol, butyl carbitol, methyl cellosolve, ethyl cellosolve, and the like. They are used alone or in combination.

After the polymerization is completed, water is charged to the polymerization medium and the organic solvent distilled off. The resulting aqueous coating compound does not contain any water-soluble surfactant, water-soluble high molecular weight molecules, water-soluble polymerization initiator, or the like, which are the components that cause the waterproof properties of the formed film to deteriorate. Further, the hydrophilic monomer (monomer B), which in excess amounts can cause poor waterproof properties in the paint film, is employed at a determined ratio to avoid any excess.

In addition, the alkoxysilane compound (monomer A), capable of hydrolysis in water, is copolymerized into the water soluble or dispersed polymer. When the organic solvent is substituted with the aqueous medium, the residue of the alkoxysilane in the polymer is hydrolyzed and crosslinkings are formed when the aqueous coating composition is applied on the surface of the various substrates and dried. The crosslinking imparts toughness to the paint film and excellent waterproof properties, which cannot be obtained in the aqueous coating compositions currently in use.

Also, the alkoxysilane compound (monomer A) has superior adhesion to metallic material, such as minerals, glass, and iron, inorganic building materials, and the like. Therefore, the aqueous coating compound of the present invention can be employed as a primer or finishing coat on paper, fiber, iron, aluminum, glass, plastic, inorganic building material, and the like.

The following working and comparative examples are further illustrative of the present invention.

EXAMPLES 1 to 5 AND COMPARATIVE EXAMPLES 1 to 6

Each component shown in Tables 1 and 2 was compounded in a flask in the amounts shown in the tables, and copolymerized by stirring for 5 hours at 80° C. Then, aqueous ammonia was added to adjust the pH to 9, and 240 parts of water were charged at the same time. The organic solvent was distilled off under reduced pressure to be completely substituted by water. The concentration of each of the resulting aqueous coating composition was 30%.

TABLE 1

| Coating Compositions (parts by weight) | | | | | |
|---|---|---|---|---|---|
| | EXAMPLES | | | | |
| | 1 | 2 | 3 | 4 | 5 |
| Methyl methacrylate | 38.5 | 28 | — | 49.5 | 49.0 |
| Styrene | 30 | 30 | — | — | — |
| Butyl acrylate | 30 | 30 | — | — | — |
| Methacrylic acid | 1 | 10 | 50 | 50 | 1 |
| 3-Methacryloxypropyl trimethoxysilane | 0.5 | 2 | 50 | 0.5 | 50 |
| Ethyl alcohol | 100 | 100 | 100 | 100 | 100 |
| Benzoyl peroxide (initiator) | 1 | 1 | 1 | 1 | 1 |

TABLE 2

Comparative Coating Compositions (parts by weight)

| | EXAMPLES | | | | | |
|---|---|---|---|---|---|---|
| | 1 | 2 | 3 | 4 | 5 | 6 |
| Methyl methacrylate | 39 | 38.8 | 38.5 | 10 | 15 | 99.0 |
| Styrene | 30 | 30 | 30 | 20 | — | — |
| Butyl acrylate | 30 | 30 | 30 | 10 | — | — |
| Methacrylic acid | 0.5 | 1 | 10 | 60 | 30 | 0.7 |
| 3-Methacryloxy-propyl trimethoxysilane | 0.5 | 0.2 | 0.2 | 1 | 55 | 0.3 |
| Ethyl alcohol | 100 | 100 | 100 | 100 | 100 | 100 |
| Benzoyl peroxide (initiator) | 1 | 1 | 1 | 1 | 1 | 1 |

The film formed by employing the aqueous coating composition of the examples and comparative examples obtained as above were tested and evaluated for adhesive strength, resistance to boiling water, waterproof and corrosion proof properties, and shelf stability in accordance with the following procedures. The results are shown in the Tables 3 and 4.

Adhesive Strength

Each aqueous coating composition was applied to a soft steel plate, a glass plate, and a polyethylene terephthalate (PET) film to make dry film thickness of 50 μm. After application the coated substrates were dried for 10 minutes at 80° C. and the dried films were tested in accordance with the cross-cut adhesion test, JIS K5400. The results were ranked from 1 to 10, with increasing numerical value representing increasing performance. The reference O represents the evaluation grade 8 to 10, V the evaluation grade 4 to 6, and X evaluation grade 0 to 2.

Boiling Water Resistance

Test pieces prepared in the same way as in the adhesive strength test were soaked in 100° C. water for 2 hours, and observed for the occurrence of blistering. The paint films were then dried at room temperature, and cross-cut adhesion tests were conducted. The examples that did not blister and that were evaluated at grade 8 to 10 in the same way as defined in the adhesion strength test, were marked with O. The examples that did not blister and that were evaluated at grade 4 to 6 in the same way as defined in the adhesion strength test were marked with V. The examples that blistered and that were evaluated at grade 0 to 2 in the same way as defined in the adhesion strength test were marked with X.

Waterproof Test

Each aqueous coating composition was diluted to 15%, applied (painted) at 120 g/m² on slate plates of 5 mm thickness (commercially available), and dried for 5 minutes at 120° C. The paint films were allowed to cool and then were tested in accordance with waterproof test, JIS A6910. The examples that were permeated with not more than 1 ml water in 24 hours were marked with O the examples that were permeated with 1 to 3 ml water in 24 hours were marked with V; and the examples that were permeated with not less than 5 ml water in 24 hours were marked with X.

Corrosion Proof Test

Samples applied to soft steel plates in the adhesion strength test were put in a salt sprayer for 72 hours and observed for occurrence of corrosion. Examples showing no corrosion were marked with O examples showing corrosion on less than 50% of the whole area were marked with V; the examples showing corrosion on more than 50% of the whole area were marked with X.

Shelf Stability Test

Examples were held at −50° C. for 3 months and then observed. Examples with no change were marked with O examples in which gelation or precipitation of particles occurred were marked with X.

TABLE 3

| | Examples | | | | |
|---|---|---|---|---|---|
| | 1 | 2 | 3 | 4 | 5 |
| Adhesion Strength | | | | | |
| Soft steel plate | O | O | O | O | O |
| Glass plate | O | O | O | O | O |
| PET film | O | O | O | O | O |
| Boiling water resistance | O | O | O | O | O |
| Waterproof property | O | O | O | O | O |
| Corrosion proof property | O | O | O | O | O |
| Shelf stability | O | O | O | O | O |

TABLE 4

| | Examples | | | | | |
|---|---|---|---|---|---|---|
| | 1 | 2 | 3 | 4 | 5 | 6 |
| Adhesion Strength | | | | | | |
| Soft steel plate | O | V | V | O | O | V |
| Glass plate | O | V | V | O | O | V |
| PET film | O | V | V | O | O | V |
| Boiling water resistance | O | V | X | X | O | V |
| Waterproof property | O | V | X | X | O | V |
| Corrosion proof property | O | V | X | X | O | V |
| Shelf stability | X* | O | O | O | X** | X* |

As shown in Tables 3 and 4, the evaluation results of the examples were excellent in all the tests. It is also apparent that the examples are excellent not only in adhesion strength, but also in waterproof properties of the formed film, contrary to the comparative example.

We claim:

1. An aqueous coating composition comprising a copolymer which is the polymerized reaction product of (A) 0.5–50% by weight of the copolymer of an alkoxysilane compound capable of hydrolysis in water and radical polymerization, wherein the alkoxysilane compound is represented by the structural formula:

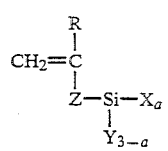

in which R is hydrogen or an alkyl group containing not more than 3 carbon atoms;

Z is —(CH$_2$)$_n$ or

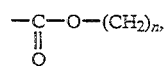

where n represents an integer 0 to 3;

X is —OCH$_3$, —OC$_2$H$_5$, or —O—(CH$_2$)$_m$—O—(CH$_2$)$_p$—H, where m and p each represents an integer 1 to 3;

Y is —O(CH$_2$)$_q$—H, where q represents an integer 0 to 3;

and a represents an integer 1 or 2;

(B) 1-50% by weight of the copolymer of a hydrophilic monomer having unsaturated double bond and containing at least one functional group selected from the group consisting of a carboxyl group, a hydroxyl group, an amide group, an amino group, a sulfone group, a sulfonium group, and polyethylene oxide, and (C) not more than 98.5% by weight of the copolymer of a hydrophobic ethylenically unsaturated monomer selected from the group consisting of acrylic, methacrylic, styrene, or mixtures thereof;

said coating composition being substantially free of surfactants and water-soluble polymerization initiators.

2. An aqueous coating composition comprising a copolymer made by the process comprising the steps of (A) providing the following monomers at the following stated weight ratios:

(i) 0.5-50% by weight of the copolymer of an alkoxysilane compound capable of hydrolysis in water and radical polymerization, wherein the alkoxysilane compound is represented by the structural formula:

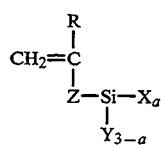

in which R is hydrogen or an alkyl group containing not more than 3 carbon atoms:

Z is —(CH$_2$)$_n$ or

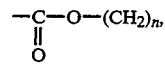

where n represents an integer of 0 to 3;

X is —OCH$_3$, —OC$_2$H$_5$, or —O—(CH$_2$)$_m$—O—(CH$_2$)$_p$—H, where m and p each represents an integer of 1 to 3;

Y is —O(CH$_2$)$_q$—H, where q represents an integer 0 to 3;

and a represents an integer 1 or 2;

(ii) 1-50% by weight of the copolymer of a hydrophilic monomer having unsaturated double bond and containing at least one functional group selected from the group consisting of a carboxyl group, a hydroxyl group, an amide group, an amino group, a sulfone group, a sulfonium group, and polyethylene oxide, and (iii) not more than 98.5% by weight of the copolymer of a hydrophobic ethylenically unsaturated monomer selected from the group consisting of acrylic, methacrylic, styrene, or mixtures thereof;

(B) copolymerizing the monomers in an organic solvent and in the substantial absence of surfactants or water-soluble polymerization initiators; and (C) substituting the organic solvent with aqueous medium.

3. The copolymer according to claim 2 made by the process in which the hydrophilic monomer having an unsaturated double bond contains a carboxyl group or a sulfone group, or both, and is added to the polymerization medium with an aqueous solution of water-soluble monovalent organic or inorganic alkaline substance.

* * * * *